US006799534B1

(12) United States Patent
Wang

(10) Patent No.: US 6,799,534 B1
(45) Date of Patent: Oct. 5, 2004

(54) ANIMAL SEPARATING FENCE IN VEHICLES

(76) Inventor: Chiu Kuei Wang, No. 101-19, Chung Cheng Li, Yuanli, Miaoli Hsien (TW)

( * ) Notice: Subject to any disclaimer, the term of this patent is extended or adjusted under 35 U.S.C. 154(b) by 0 days.

(21) Appl. No.: 10/642,239

(22) Filed: Aug. 18, 2003

(51) Int. Cl.[7] .................................................. P60P 3/04
(52) U.S. Cl. ....................................... 119/412; 119/771
(58) Field of Search ................................ 119/412, 771, 119/441, 473, 786, 523, 453, 496; 256/1, 63–68; D12/195, 400, 414; 296/37.16, 152, 24.2; 280/748–749; 410/129, 145; D30/108

(56) References Cited

U.S. PATENT DOCUMENTS 4,528,768 A * 7/1985 Anderson ................... 43/21.2
4,852,290 A * 8/1989 Wallace et al. ................ 43/17
D326,076 S * 5/1992 Wiese ....................... D12/414
5,167,246 A * 12/1992 Mortenson .................. 135/153
5,402,596 A * 4/1995 Gillming, Jr. ................ 43/54.1
6,305,869 B1 * 10/2001 Chen ....................... 403/109.5
D473,838 S * 4/2003 Wang ........................ D12/414
6,582,169 B1 * 6/2003 Cano-Rodriguez et al. . 410/128

* cited by examiner

*Primary Examiner*—Charles T. Jordan
*Assistant Examiner*—Kimberly S. Smith
(74) *Attorney, Agent, or Firm*—Rosenberg, Klein & Lee

(57) ABSTRACT

An animal separating fence used in vehicles includes two posts each have a top sucking member and a bottom sucking member for respectively positioning the fence between the ceiling and the floor of the vehicle. Two sleeves are mounted to each of the posts and each sleeve includes two extensions and a passage is defined through each of the extensions. Two side walls extend from each of the extensions and a space is between the two side walls and communicates with the passage. Two transverse tubes extend through the passages of the extensions. A locking member is pivotably connected between the two side walls of each of the extensions and each locking member has a cam head which is pivoted to press the transverse tube to position the transverse tubes.

1 Claim, 7 Drawing Sheets

111
13
15
11
24
23
22
21
12
10
14

ANIMAL SEPARATING FENCE IN VEHICLES

FIELD OF THE INVENTION

The present invention relates to a separating fence used in vehicles for restricting animals in the vehicle in a predetermined space.

BACKGROUND OF THE INVENTION

A conventional animal separating fence in vehicles is shown in FIGS. 6 and 7, and generally includes two posts 10 each have a top sucking members 13 and a bottom sucking member 14 for respectively contacting against the ceiling and the floor of the vehicle. Each post 10 includes a rod 12 and two sleeves 11 are mounted to the rod 12 and positioned by two screws 25. Each sleeve 11 includes two extensions 111 extending radially outward and a groove 112 is defined through each extension 111 so that two transverse tubes 21 extend through the grooves 112. Two U-shaped parts 22 are inserted into the two open ends of the two transverse tubes 21 with a bush 211 located between the U-shaped parts 22 and the transverse tubes 21. The user has to use a screw driver to release the screws 25 before adjusting the connection of the rods 12 and the sleeves 11. The transverse tubes 21 are not clamped by the extensions 111 so that they could be moved by the animals or even drop from the extensions 111.

The present invention intends to provide a separating fence that employs cam device to secure the position of the transverse tubes so that the user can easily adjust the transverse tubes without need of screw drivers or other tools.

SUMMARY OF THE INVENTION

In accordance with one aspect of the present invention, there is provided a separating fence which comprises two posts and a top sucking member and a bottom sucking member are respectively connected to two ends of the posts. Two sleeves are mounted to each of the posts and each sleeve includes two extensions extending radially outward therefrom. A passage is defined through each of the extensions and two side walls extend from each of the extensions and a space between the two side walls 1110 is in communication with the passage. Two transverse tubes extend through the passages of the extensions. A locking member is pivotably connected between the two side walls of each of the extensions and each locking member has a cam head and a lever. The cam head is pivoted to press the transverse tube to position the transverse tubes.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
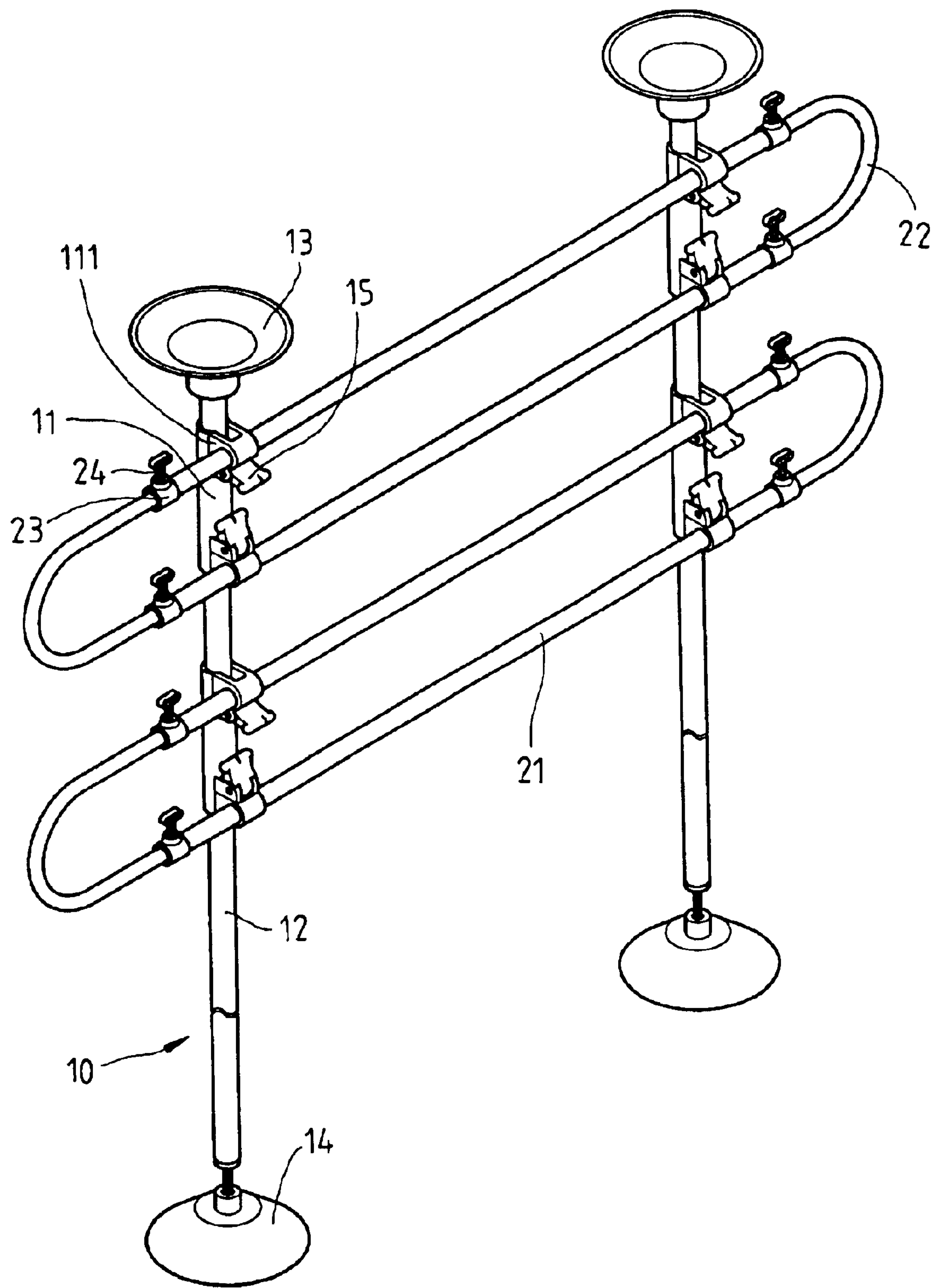
FIG. 1 is a perspective view to show the separating fence of the present invention.
Figure 2:
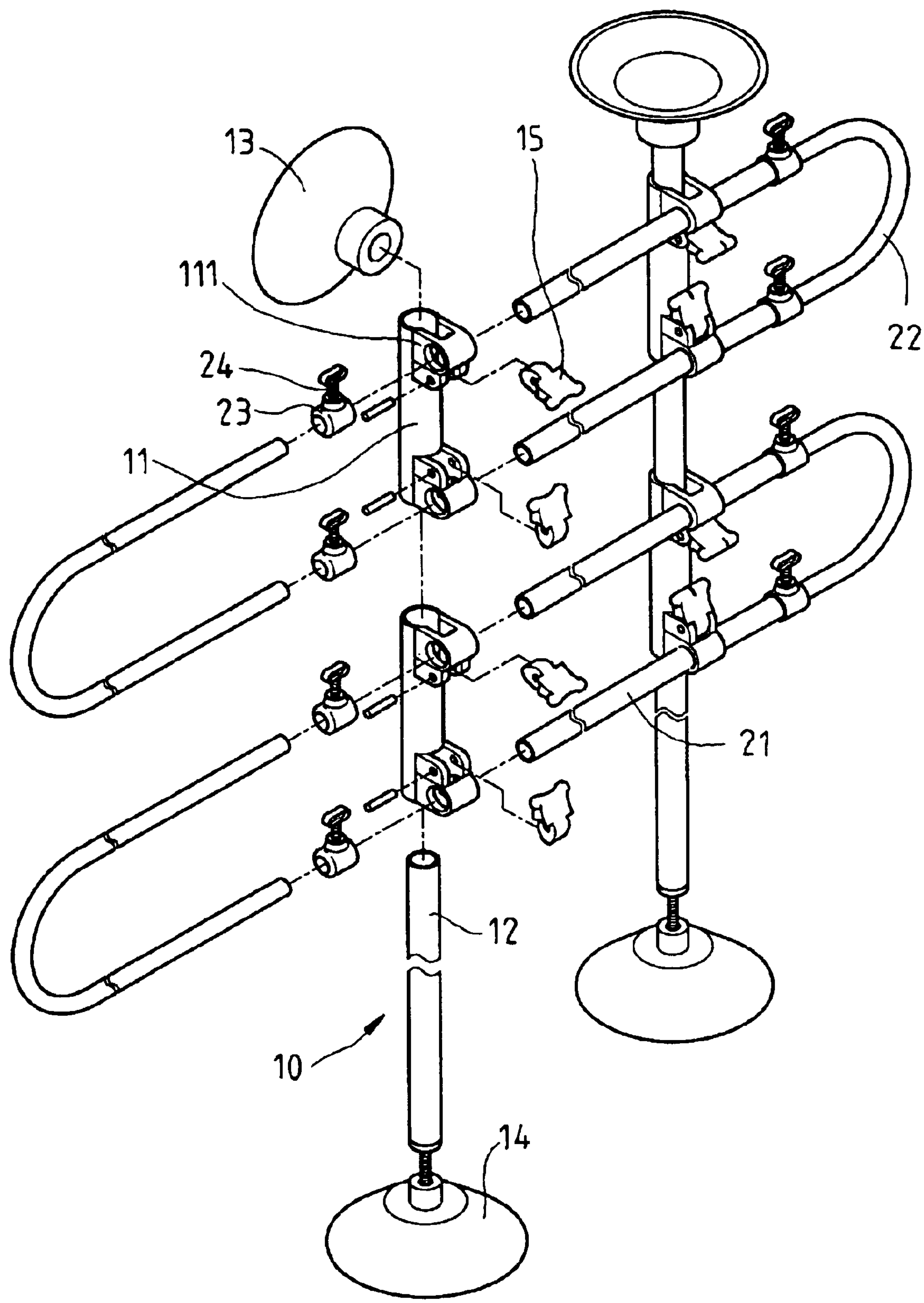
FIG. 2 is an exploded view to show the separating fence of the present invention.
Figure 3:
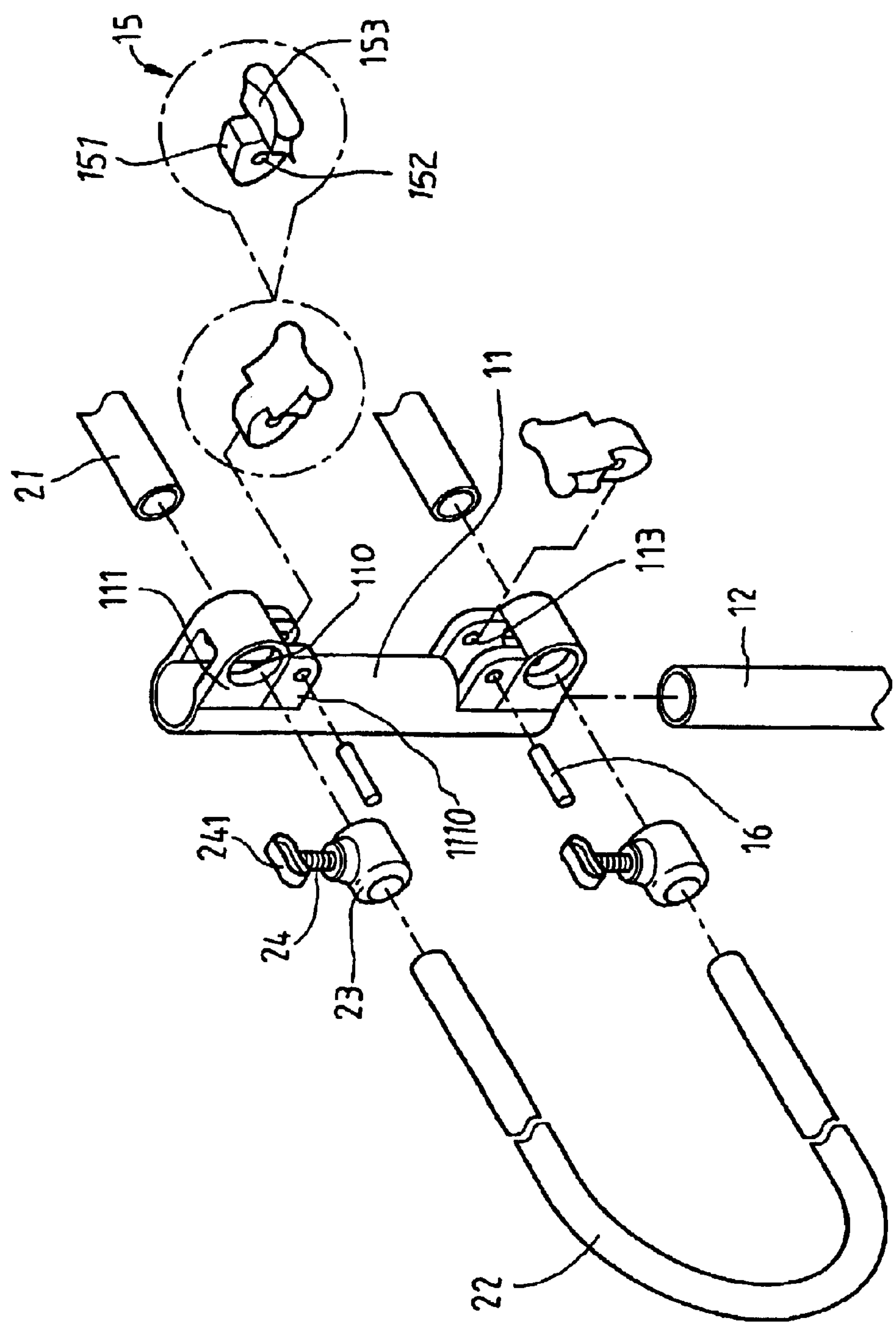
FIG. 3 is an exploded view to show the transverse tubes, the extensions on the sleeve and the locking members of the present invention.
Figure 5:
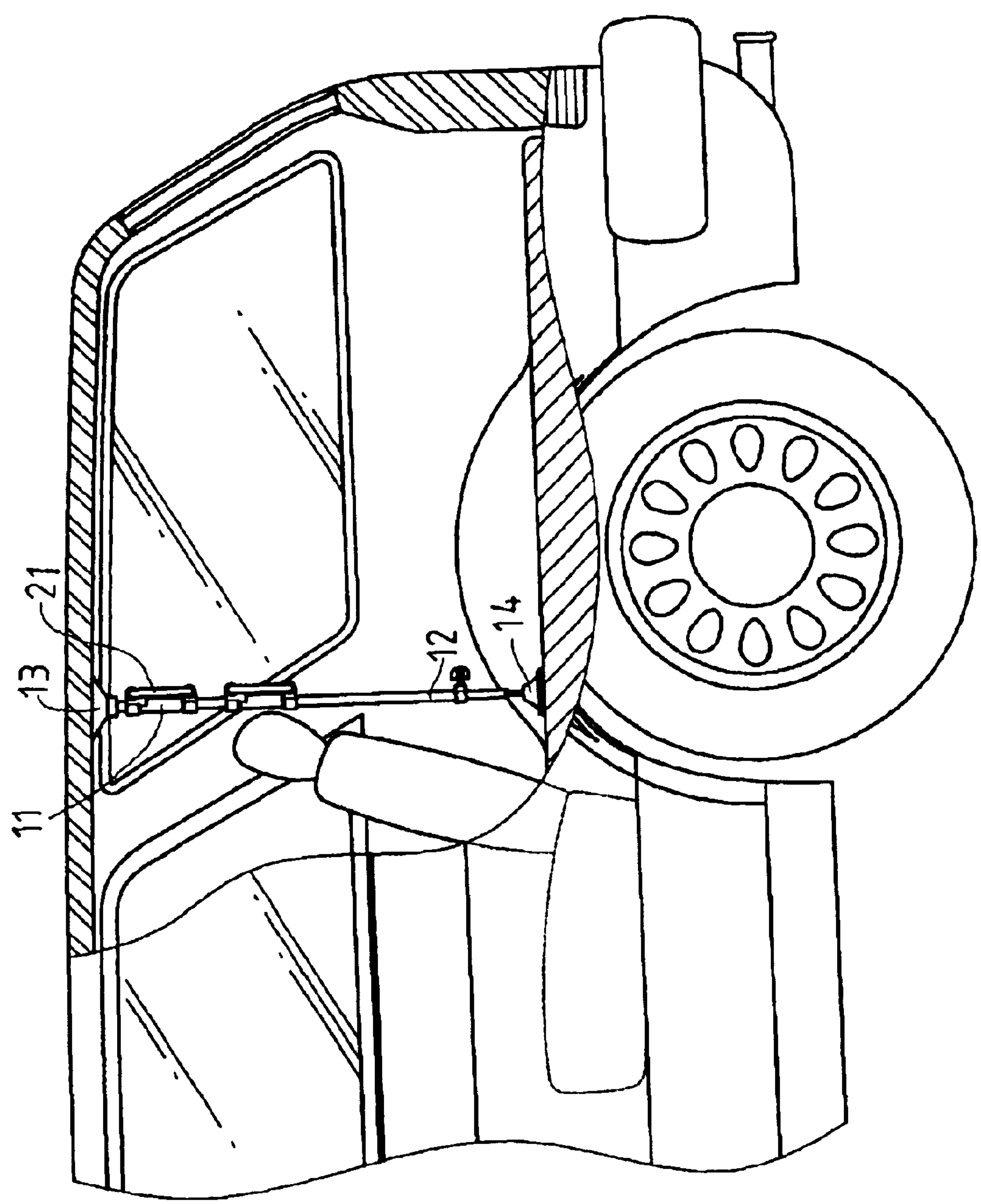
FIG. 5 shows that the separating fence is installed in a vehicle.
Figure 6:
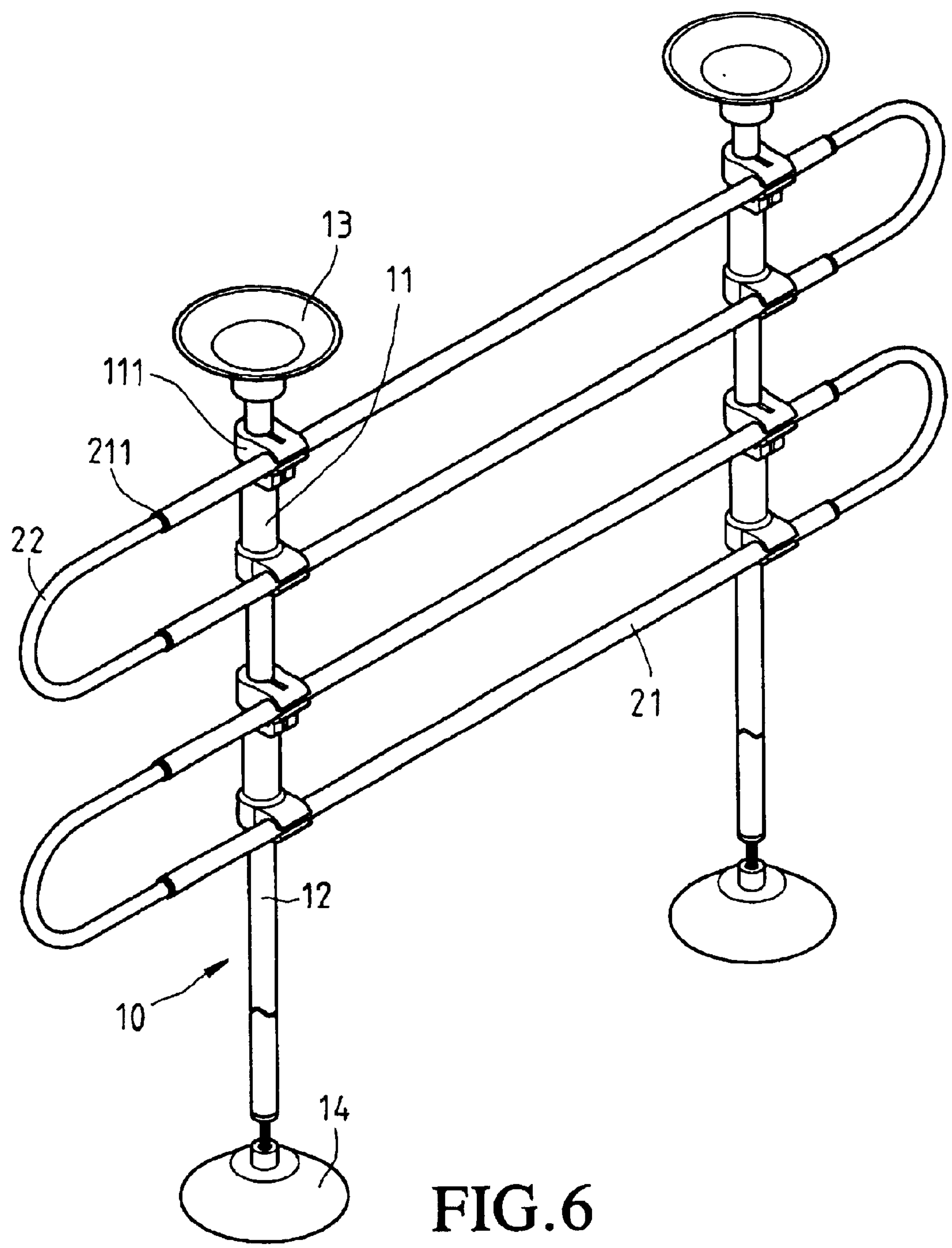
FIG. 6 is a perspective view to show a conventional separating fence.
Figure 7:
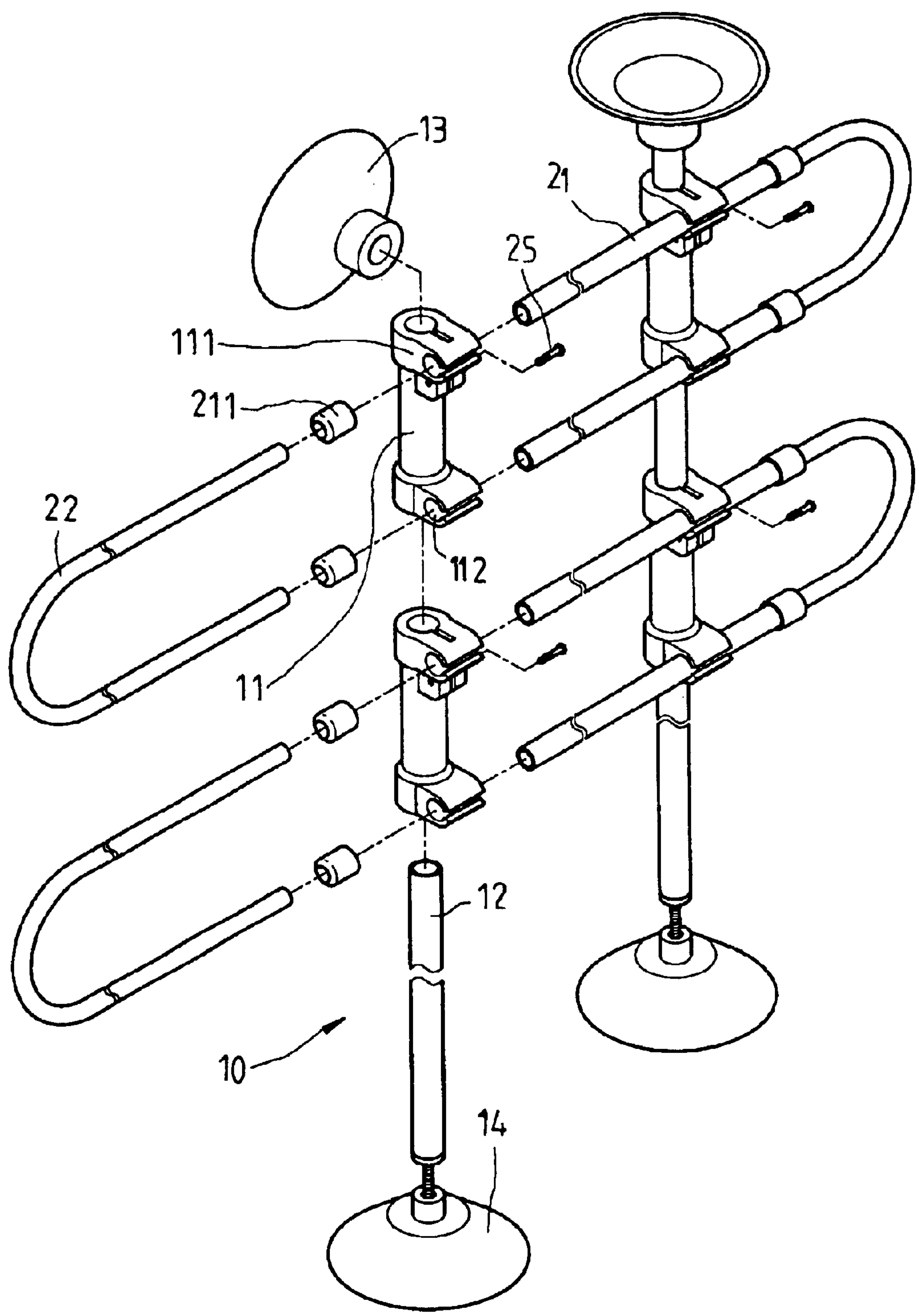
FIG. 7 is an exploded view to show the conventional separating fence.

Referring to FIGS. 1 to 3, the animal separating fence of the present invention comprises two posts 10 each have a rod 12 with a top sucking member 13 connected to a top of the rod 12 and a bottom sucking member 14 connected to a lower end of the rod 12. The top sucking member 13 is used to contact against the ceiling of a vehicle and the bottom sucking member 14 is used to rested on the floor of the vehicle as shown in FIG. 5.

Two sleeves 11 are mounted to each of the rods 12 and each sleeve 11 includes two extensions 111 extending radially outward therefrom. A passage 110 is defined through each of the extensions 111 and two side walls 1110 extend from each of the extensions 111. A space between the two side walls 1110 is in communication with the passage 110. Two transverse tubes 21 extend through the passages 110 of the extensions 111 and a U-shaped part 22 has two legs thereof inserted in open ends of the transverse tubes 21 so as to reach two sides of the vehicle.

Figure 4B:
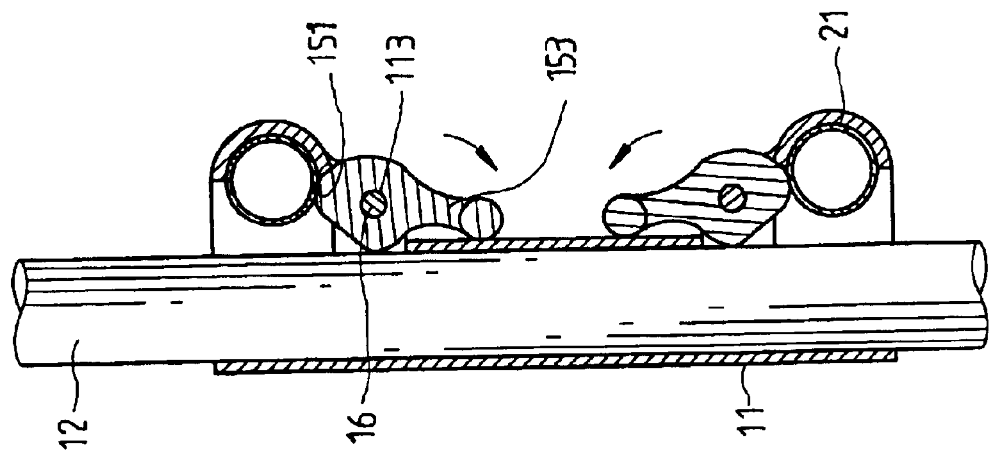
FIG. 4B shows the locking members are in locked position.
Figure 4A:
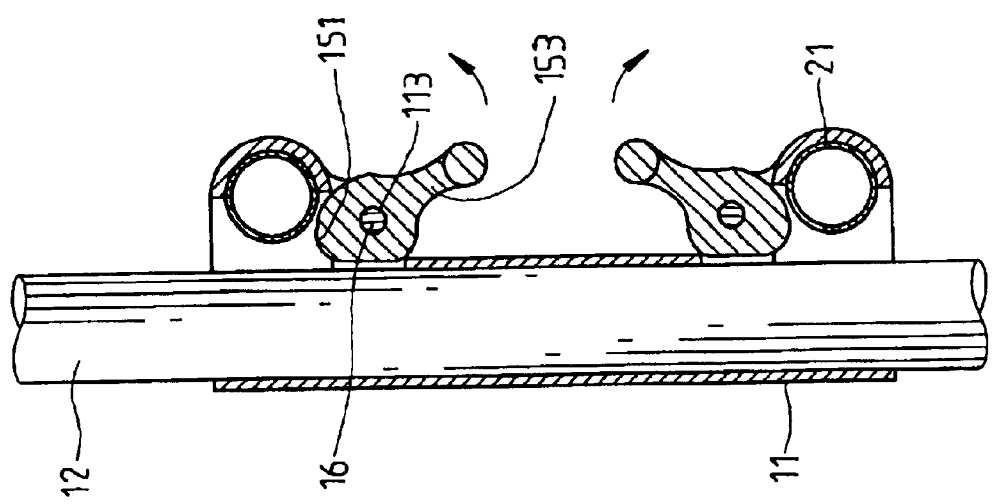
FIG. 4A shows the locking members are in unlock position.

A locking member 15 having a cam head 151 and a lever 153 connected to the cam head 151 is pivotably connected between the two side walls 1110 of each of the extension 111 by a pin 16 extending through holes 113 in the two side walls 1110 and a hole 152 in the cam head 151. The cam head 151 can be pivoted to press the transverse tube 21 to position the transverse tubes 21 by pivoting the lever 153 as shown in FIG. 4B or to release from the transverse tube 21 by pivoting the lever 153 in opposite direction as shown in FIG. 4A.

Each transverse tube 21 has a positioning member 23 mounted thereto and a bolt 24 extends through a wall of the positioning member 23 so that when rotating the bar 241 on the top of the bolt 24, the bolt 24 may press the leg of the U-shaped part 22 in the open end of the transverse tube 21.

The animal separating fence of the present invention is easily to adjust its width and the positions of the transverse tubes 21 without using any tools.

While we have shown and described the embodiment in accordance with the present invention, it should be clear to those skilled in the art that further embodiments may be made without departing from the scope of the present invention.

What is claimed is:

1. A separating fence comprising:

two posts each having a rod with a top sucking member connected to a top of the rod and a bottom sucking member connected to a lower end of the rod;

two sleeves mounted to each of the rods and each sleeve including two extensions extending radially outward therefrom, a passage defined through each of the extensions, two side walls extending from each of the extensions and a space between the two side walls being in communication with the passage;

two transverse tubes extending through the passages of the extensions;

a locking member pivotably connected between the two side walls of each of the extensions, each locking member having a cam head and a lever connected to the cam head, the cam head being pivoted to press the transverse tube to position the transverse tubes; and;

a U-shaped part having two legs inserted in open ends of the transverse tubes, each transverse tube having a positioning member mounted thereto and a bolt extending through a wall of the positioning member so as to press the leg of the U-shaped part in the open end of the transverse tube.

* * * * *